E. H. W. CROSSLEY.
DEVICE FOR INDICATING THE LOCATION OF WRECKS AND DISABLED MARINE VESSELS.
APPLICATION FILED OCT. 20, 1915.
1,250,807.
Patented Dec. 18, 1917.
2 SHEETS—SHEET 1.
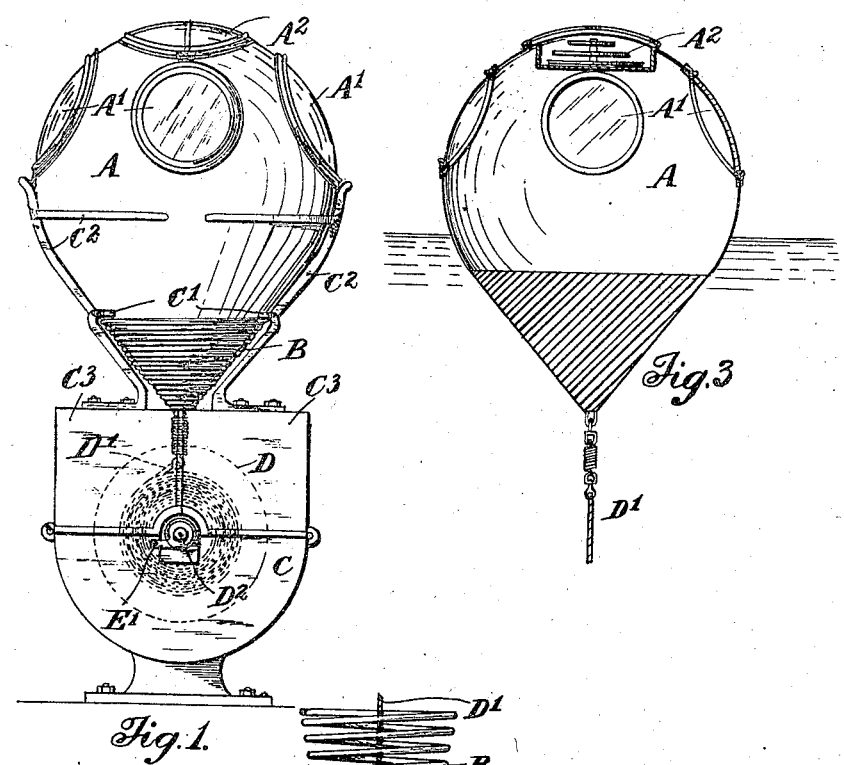
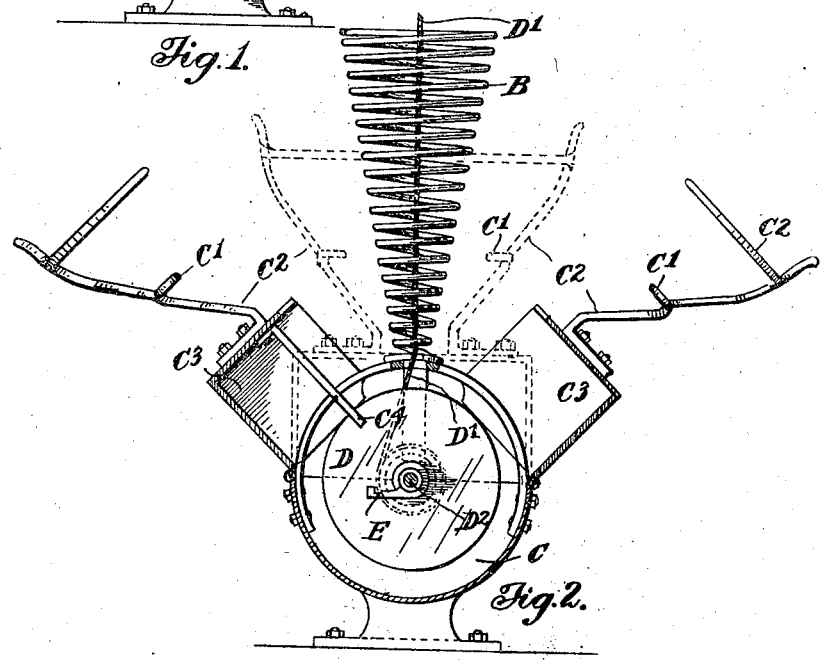
E. H. W. CROSSLEY.
INVENTOR
By G. Croydon Marks
ATTORNEY.

E. H. W. CROSSLEY.
DEVICE FOR INDICATING THE LOCATION OF WRECKS AND DISABLED MARINE VESSELS.
APPLICATION FILED OCT. 20, 1915.

1,250,807.

Patented Dec. 18, 1917.
2 SHEETS—SHEET 2.

E. H. W. Crossley.
INVENTOR.
By G. Croydon Marks
ATTORNEY.

UNITED STATES PATENT OFFICE.

ERNEST HENRY WEST CROSSLEY, OF MELBOURNE, VICTORIA, AUSTRALIA.

DEVICE FOR INDICATING THE LOCATION OF WRECKS AND DISABLED MARINE VESSELS.

1,250,807. Specification of Letters Patent. Patented Dec. 18, 1917.

Application filed October 20, 1915. Serial No. 56,880.

*To all whom it may concern:*

Be it known that I, ERNEST HENRY WEST CROSSLEY, subject of the King of Great Britain, residing at Collins House, 360–366 Collins street, Melbourne, in the State of Victoria, Commonwealth of Australia, have invented certain new and useful Improvements in an Improved Device for Indicating the Location of Wrecks and Disabled Marine Vessels, of which the following is a specification.

This invention relates to an improved device for indicating the location of wrecks and disabled marine vessels and refers more especially to apparatus to be carried aboard sea-going vessels, in order that the location of the same may be indicated in the event of it becoming wrecked, foundered, or disabled.

This invention comprises two floatable buoys which are accommodated upon the deck of the vessel in such a manner that in the event of the vessel being wrecked or foundered one of the said buoys which is captive indicates the location while the other buoy which is free is adapted to drift upon the sea carrying proper records so that when later picked up it may give authentic information as to the said vessel.

The object of this invention is to provide means for mounting the said buoys so that in the event of the vessel assuming a dangerous angle or when submerged beneath the water they are released and projected by means of a spring clear of the vessel thereby avoiding the masts and rigging while further the said buoys are provided with means for assisting in attracting attention and for the accommodation of proper records for the identification of the vessel and such like.

I accomplish this object by mounting the buoys in a stand or carrier having a spring in compression upon which the said buoy is seated having catches which are released when the vessel assumes a dangerous angle or becomes submerged enabling the said springs to project the said buoys clear of the said vessel. These buoys are provided with mirrors inset within the shell, for the purpose of attracting attention by reflection while further suitable lights may be provided and in addition suitable pockets for the accommodation of certain records for the identification of the vessel and a calendar or the like indicating the date upon which the said buoy was projected into the water.

In the case of the captive buoy the stand or casing carries a drum upon which is wound a cable or wire to which the buoy is attached, the said cable or wire being preferably marked so that the depth of water may be indicated while in the case of the free buoy the same is allowed to drift upon the sea when released.

In practice it is necessary that daily attention to these buoys is insured by regulation so that the calendars are set from day to day and the proper records inserted indicating the location, bearings, course, and other particulars so that in the event of accident the latest information as to the ship may be available.

The invention will now be more fully described aided by a reference to the accompanying sheets of drawings in which—

Figure 1 is an elevation of the captive buoy mounted in position on the deck of the vessel.

Fig. 2 is a sectional elevation of the device for supporting the buoy, the said device being opened by the sinking of the vessel and the buoy released.

Fig. 3 is a section of the captive buoy floating on the surface of the water above the submerged vessel.

Figure 4:
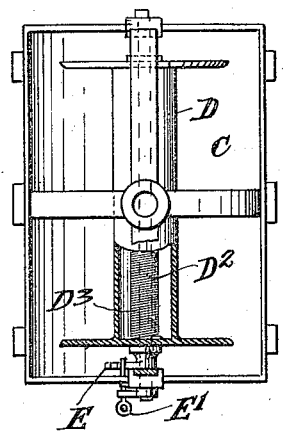
Fig. 4 is a plan partly in section of the winding drum casing.
Figure 7:
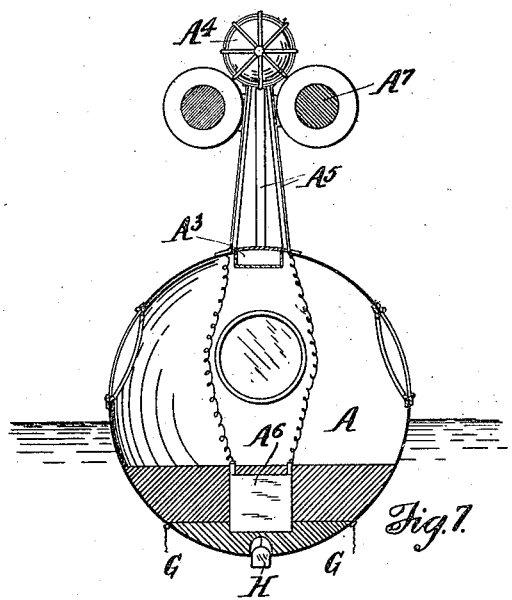
Fig. 7 shows the free buoy floating on the surface of the water.
Figure 5:
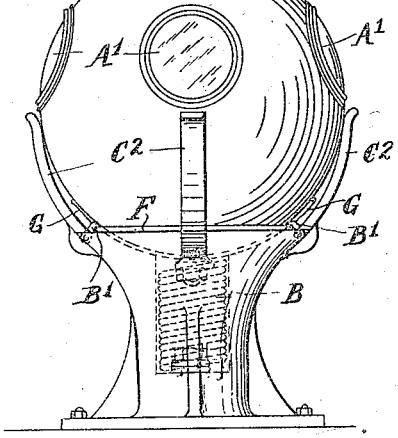
Fig. 5 is an elevation of the free or floating buoy mounted on the deck of the vessel.
Figure 6:
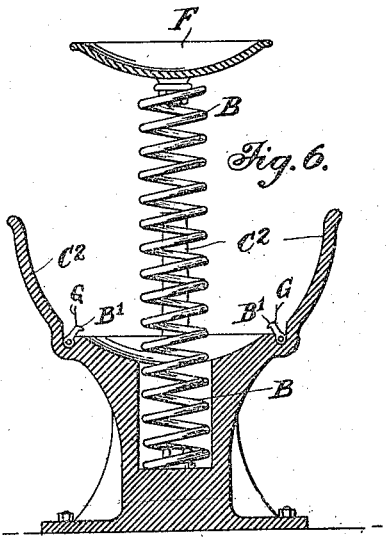
Fig. 6 is a sectional elevation of the device for supporting the said buoy, the said device being shown open and the buoy released.

Referring to these drawings Figs. 1 to 4 illustrate the captive buoy and Figs. 5 to 7 a free buoy constructed according to this invention. I will now proceed to describe the captive buoy.

The captive buoy A is constructed preferably of metal as shown suitably ballasted and furnished with reflecting mirrors A' and a revolving daily calendar A². These reflecting mirrors A' are arranged above the water line as shown in Fig. 3 so that they can be readily seen by a passing vessel. This buoy A is adapted to be supported above a powerful spring B mounted upon the case C of a winding drum D about which is wound a deep sea cable or wire D' attached to the buoy A. The spring B is kept depressed by lugs C' projecting from suitable prong supports or the like $C^2$ adapted to hold the buoy in position during the rolling of the vessel. These prong supports $C^2$ are mounted on the hinged covers $C^3$ of the case C which are kept closed by the weight of the buoy A.

The winding drum D is mounted on a spindle $D^2$ and is actuated by a spring $D^3$ to assist in the unwinding of the rope when the drum D is released by the sinking of the vessel. This cable or wire $D'$ may be marked in fathoms or other units to denote the depth of water. A pawl E is connected to the drum D and is adapted to engage a key $C^4$ attached to the hinged covers $C^3$ whereby the spring actuated drum D is locked when the covers are in their closed position. A pin $E'$ is provided whereby the said pawl E may be locked when the covers $C^3$ are opened for inspection purposes. (Fig. 4.)

The free or floating buoy A is constructed preferably spherical as shown having reflecting mirrors $A'$ and suitably ballasted. A hermetically sealed pocket $A^3$ is provided in which is placed a daily log giving the course of the vessel, date, last port of call and any other necessary information required for the identification of the vessel.

An illuminating device is attached to this buoy in order that the same may be seen at night time by passing vessels. This device comprises a suitable globe $A^4$ supported on a suitable standard or frame $A^5$ and suitably colored in order that it can be distinguished from existing lights. The said globe $A^4$ may be illuminated by such as an electric lamp connected to a storage battery $A^6$ situated within the buoy and automatically operated by means of a switch when the buoy is released such as by the weight H seated in a recess in the bottom of the buoy the falling of which operates the necessary switch. Suitable reflection disks $A^7$ are also provided. If desired the aforesaid globe $A^4$ may be illuminated by suitable gas such as acetylene.

This buoy A is mounted upon a saucer shaped seat or support F attached to the upper end of a suitable spring B the lower end of which is connected to the base of a casing C which is attached to the deck of the vessel.

The said spring B is kept compressed by suitable catches $B'$ adapted to engage the rim of the saucer shaped seat or support F while vertical supports $C^2$ are provided for supporting the buoy A during the rolling of the vessel. The buoy A is further secured by suitable wires G or the like one end of which is connected to the buoy and the other end to the aforesaid spring catches $B'$. These wires G are only sufficiently strong to hold the buoy A in position but are broken when the full weight of the buoy is thrown on them by the buoy assuming a dangerous angle or by immersion in the water whereby the buoy is released.

The operation of the captive buoy is as follows:—Should the vessel assume a sinking or other dangerous angle the weight of the buoy on one side causes the prong supports $C^2$ to open and release the lugs $C'$ causing the spring B to project the buoy clear of the vessel at the same time the spring $D^3$ causes the drum D to unwind and thus facilitate the releasing of the cable or wire $D'$.

Should the vessel sink without first assuming the aforesaid angle, the uplift of the water when the buoy is submerged causes the aforesaid supports $C^2$ to open and the spring B is released as before-mentioned, while at the same time the cable $D'$ is being paid out until the vessel settles on the bottom when the buoy floating on the surface indicates the location thereof and the calendar $A^2$ indicates the date of the wreck and the record identifies the vessel. The reflection of light rays by the mirrors $A'$ insure that the buoy will be distinguished by a passing vessel from a distance.

The free buoy is released in a somewhat similar manner to the captive buoy according to the position of the vessel. On the free buoy becoming submerged the strain on the wires G first releases the catches $B'$ which in turn releases the spring B the tension of which causes the wires G to break and free the buoy which is then at the mercy of the currents and free to float until picked up by a passing vessel. Similarly the wires G are broken by the vessel assuming a dangerous angle.

I claim—

1. A device for indicating the position of wrecks, comprising a compression spring, a support therefor, a buoy located above said spring, and means operated by the weight of the buoy to hold the spring compressed but movable when the buoy is submerged, to release the spring to project the buoy.

2. A device for indicating the positions of wrecks, comprising a compression spring, a support therefor, a buoy located above said spring, and means operated by the weight of the buoy to hold the spring compressed but movable by the spring when the buoy is submerged, to release the spring to project the buoy.

3. A device for indicating the position of wrecks, comprising a compression spring, a support therefor, a buoy located above said spring, and a plurality of pivoted members normally held by the weight of the buoy in engagement with the spring to hold it compressed, but movable outwardly when the buoy is submerged to release the spring to project the buoy.

4. A device for indicating the position of wrecks, comprising a compression spring, a support therefor, a buoy located above said spring, and means normally holding the spring compressed but operable when the buoy is moved upwardly on submergence thereof to release the spring to project the buoy.

5. A device for indicating the position of wrecks, comprising a compression spring, a support therefor, a buoy located above said spring, and a plurality of pivoted members normally holding the spring compressed, but movable outwardly when the buoy is moved upwardly on submergence thereof, to release the spring to project the buoy.

6. A device for indicating the position of wrecks, comprising a compression spring, a support therefor, a buoy located above said spring, and means normally holding the spring compressed but movable by the buoy when the axis thereof becomes inclined more than a predetermined angle from the vertical to release said spring to project the buoy.

7. A device for indicating the position of wrecks, comprising a compression spring, a support therefor, a buoy located above said spring, and a plurality of pivoted members normally holding the spring compressed, but movable outwardly by the buoy when the axis thereof becomes inclined more than a predetermined angle from the vertical to release the spring to project the buoy.

8. A device for indicating the position of wrecks, comprising a compression spring, a support therefor, a buoy located above said spring, and means held by the buoy in position to hold the spring compressed, but movable when the buoy is submerged to release the spring to project the buoy.

9. A device for indicating the position of wrecks, comprising a compression spring, a support therefor, a buoy located above said spring, and means held by the buoy in position to hold the spring compressed, but movable by the spring when the buoy is submerged to release the spring to project the buoy.

10. A device for indicating the position of wrecks, comprising a casing, a rotatable drum therein, a compression spring supported on said casing exteriorly thereof, a buoy located above said spring, a rope wound on said drum and connected to said buoy, and means on the exterior of said casing normally holding said spring compressed but movable to release the spring to project the buoy on submergence thereof, or when the axis thereof is inclined more than a predetermined degree from the vertical.

11. A device for indicating the position of wrecks, comprising a casing, a spring-actuated rotatable drum therein, a compression spring supported on said casing, a buoy located above said spring, a rope wound on said drum and connected to said buoy, means normally holding said spring compressed, and means normally holding said drum from rotation, both of said means being movable to release the spring and drum respectively when the buoy is submerged or when the axis thereof is inclined more than a predetermined degree from the vertical.

12. A device for indicating the position of wrecks, comprising a casing, a rotatable drum therein, a compression spring, supporting means for said spring carried by said casing, hinged covers on said casing normally held closed, a buoy located above said spring, a rope wound on said drum and connected to said buoy, and means on said covers for holding said spring compressed, said means being operable by said buoy when the axis thereof becomes inclined more than a predetermined angle from the vertical to open said covers and release said spring to project the buoy.

13. A device for indicating the position of wrecks, comprising a casing, a rotatable drum therein, a compression spring, supporting means for said spring carried by said casing, hinged covers on said casing normally closed, a buoy located above said spring, a rope wound on said drum and connected to said buoy, means on said covers having parts engaging said spring to hold the same compressed, and other parts engaged by the buoy to hold said covers closed, said means being movable to open said covers and to release the spring to project the buoy when the latter is submerged.

In testimony whereof I affix my signature in presence of two witnesses.

ERNEST HENRY WEST CROSSLEY.

Witnesses:
CLEMENT A. HACK,
G. R. CULLEN.